Aug. 15, 1950  J. E. LUNDBERG ET AL  2,519,058
DEVIATION COMPENSATOR

Filed June 7, 1949  4 Sheets-Sheet 2

Inventors:
John E. Lundberg,
Robert G. Ballard,
by Harvell & Mack
Their Attorney.

Aug. 15, 1950    J. E. LUNDBERG ET AL    2,519,058
DEVIATION COMPENSATOR

Filed June 7, 1949    4 Sheets-Sheet 3

Inventors
John E. Lundberg
Robert G. Ballard
by  Prowell & Mack
His Attorney

Inventors:
John E. Lundberg,
Robert G. Ballard,
by *Prowell S Mack*
Their Attorney.

Patented Aug. 15, 1950

2,519,058

UNITED STATES PATENT OFFICE 2,519,058

DEVIATION COMPENSATOR

John E. Lundberg, Marblehead, and Robert G. Ballard, Saugus, Mass., assignors to General Electric Company, a corporation of New York Application June 7, 1949, Serial No. 97,684

16 Claims. (Cl. 318—24)

1

The present invention relates to telemetering and control arrangements and, more particularly, to improved telemetric and control systems wherein errors are minimized.

In electrical circuit arrangements wherein a predictable error in a certain intelligence signal occurs, it is known that compensation therefore may be achieved by the insertion of an appropriate corrective signal having predetermined characteristics such that the combined intelligence and corrective signals will produce substantially the same result which would obtain from the intelligence signal alone if it were without error. This invention, however, is concerned with the minimizing of errors ensuing from all sources, mechanical and electrical, in electromechanical systems, particularly those control and telemetering arrangements wherein the angular orientation of a rotatable member represents an intelligence indication.

Particularly advantageous utilization of the subject invention, though not limited thereto, occurs in cooperation with a compass-controlled directional gyroscope arrangement, and the principles thereof may be readily comprehended with reference to such a combination. It should be appreciated by those skilled in the art that where a directional gyroscope is corrected in its azimuth indications by a torque motor responsive to signals which represent the difference between the gyroscope and magnetic compass headings, numerous errors of both mechanical and electrical origin may operate to prevent the indications or control signals derived from the combination from being highly accurate. Further, these inaccuracies may be of variable magnitude and sense for each of the angular positions within the 360 degrees of azimuth indications or signals supplied by the compass-controlled directional gyro system. In accordance with the present invention, these errors may be rendered of negligible influence upon the system output by an entirely automatic compensation therefore accomplished by the proper introduction of corrective signals of such magnitude and phase that the system output signal for any azimuth heading will be of substantially the theoretically precise value. The compensation signals are produced by an arrangement which automatically delivers an electrical signal of predetermined phase and amplitude when a particular magnetic compass heading obtains, and this signal is injected into the compass-controlled gyro system such that the output therefrom is corrected for all errors. In other system embodiments, as will

2 appear hereinafter, the compensator arrangement may be responsive to elements other than the magnetic compass with similar results. A compensator which is adjustable to deliver any desired number of compensation signals, each independently variable in phase and magnitude, may be produced in accordance with this invention.

It is, therefore, one object of the present invention to provide improved telemetering and control systems wherein errors are minimized by compensation therefore.

A second object is to provide a compass-controlled directional gyro system wherein errors are made negligible by an automatic compensation arrangement.

Further, it is an object to provide means for automatically compensating for errors at a plurality of angular positions of rotatable elements in telemetering and control systems.

Still further, this invention provides compensator means for producing a plurality of compensation signals, each independently variable in phase and magnitude, and each being produced when the elements of the compensator have a predetermined angular orientation.

These and additional objects and features of the subject invention are disclosed in detail in the following description wherein reference is made to the accompanying drawings, in which.

Figure 1:
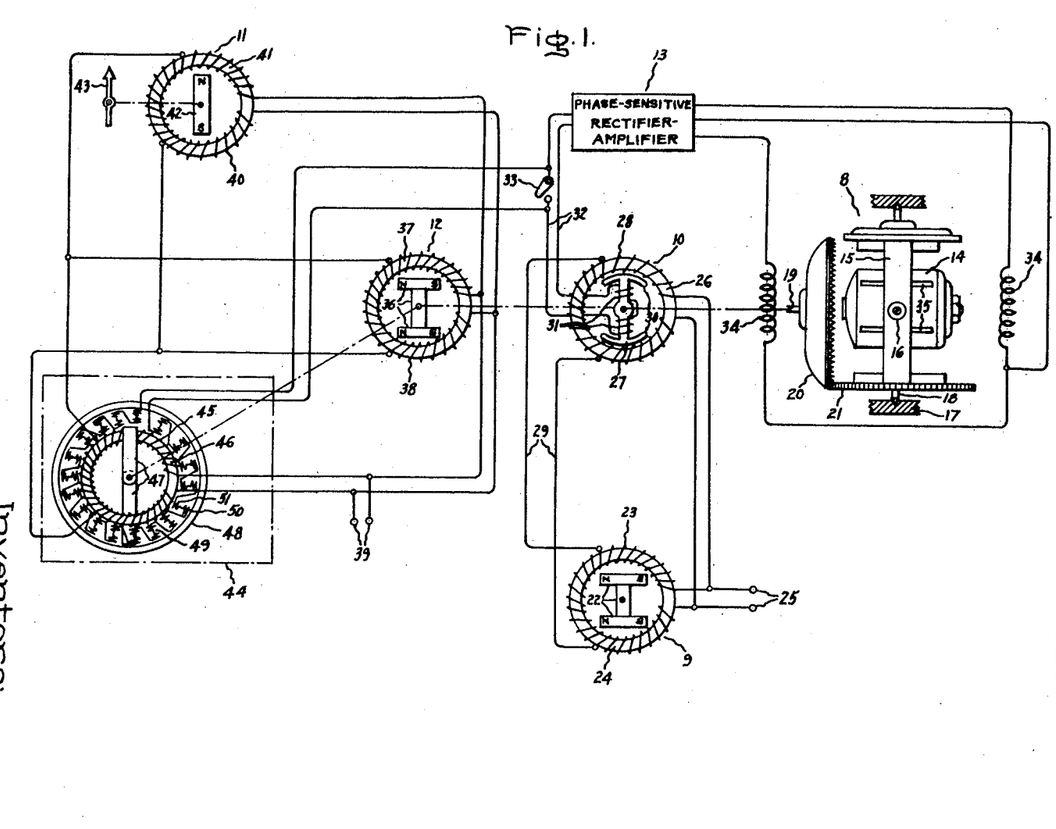
Figure 1 illustrates, partly in schematic and partly in pictorial form, a compass-controlled directional gyroscope system including error compensation in accordance with this invention.

In conventional telemetering, indicating or control arrangements, the output signals may be at considerable variance with the theoretical values thereof because of electrical and mechanical errors of the individual elements of the system and because the total system accuracy is the composite accuracy of the individual system elements. As previously set forth, these errors may be eliminated by a deviation compensator which automatically introduces a correction signal when required. Figure 1 shows this accomplished in a compass-controlled directional gyro system which comprises the conventional elements, including a directional gyroscope 8, remotely mounted magnetic compass transmitter 9, electrical detector Selsyn 10, remote indicator 11, transmitter 12, and phase-sensitive rectifier-amplifier 13.

The directional gyroscope 8 comprises a rapidly spinning rotor, not shown, mounted in the frame 14 which is pivotally supported in the gimbal 15 by means of trunnions 16. Gimbal 15 is, in turn, supported pivotally with respect to the outer frame 17 by trunnions 18. Shaft 19 indicates the angular position of the gyroscope by its own angular orientation, which is established by the attached cup gear 20 driven by gear 21 mounted on the gimbal 15. The remote magnetic compass transmitter 9 includes the pair of rotatable magnetic elements 22 which aligns itself with the horizontal component of the earth's magnetic field, and a uniformly distributed exciting winding 23 wound upon a stationary annular core, 24, of permeable magnetic material such as "Permalloy." Winding 23 is energized by a suitable source of alternating current, the supply terminals of which are represented by numeral 25, and the core 24 is arranged to be saturated periodically by the alternating current flowing in the exciting winding such that the magnetic flux from the compass magnetic elements 22 flowing in the core 24 is caused to pulsate and produce induced second harmonic voltages in the winding 23. Detector unit 10, which is essentially a polyphase Selsyn, comprises a stationary annular stator 26 of magnetic material, which may be coupled with frame 17 of the gyroscope, and a coaxially positioned rotor 27, which is coupled for rotation with the output shaft 19 of gyroscope 8. A toroidal winding 28 is arranged upon the detector rotor 27 and is also connected with the alternating current supply terminals 25. The compass transmitter and detector unit windings are provided with corresponding taps and polyphase connections 29 which symmetrically interconnect the windings electrically, whereby an alternating current flux is produced across the diameter of detector core 26, the axial direction of this flux varying in accordance with the orientation of the compass magnets relative to the transmitter stator. Detector rotor 27, constructed of magnetic material, forms a path for the second harmonic flux traversing the stator core diameter, and is shown to have arcuate pole pieces 30 which assist in collecting the stator flux. Practically, the stator core could also include salient pole pieces, not illustrated, to further assist passage of the second harmonic flux by the provision of a low reluctance magnetic path. A single phase detector rotor coil 31 is wound upon rotor 27 and delivers alternating current signals directly to the phase-sensitive rectifier amplifier 13 through leads 32 when the switch 33 is closed.

Direction or azimuth heading of the supporting aircraft is obtained from the angular orientation of the gyroscope output shaft 19 which is rotated by cup gear 20 when the aircraft maneuvers to various headings with respect to the gyro rotor axis and gimbal 15. However, since a directional gyroscope tends to wander or drift slowly from a predetermined compass direction because of the earth's rotation, friction of the gimbal bearings, and other influences, a torque motor is utilized to overcome this difficulty by continuously precessing the gyro to maintain the spin axis thereof in predetermined relationship with the magnetic meridian as measured by the magnetic compass 9. Precession is accomplished by the torque motor windings 34 in cooperation with other elements, which may, for example, include magnets 35 mounted in the gyro rotor frame 14. Direct currents passed through the windings 34 from the phase-sensitive rectifier-amplifier 13 produce magnetic fields which interact with the fields from magnets 35 such that the desired precessing torque is applied to the gyro about the horizontal gimbal axis. The polarity and magnitude of these direct currents depend upon the polarity and magnitude of the alternating current signals applied to the rectifier-amplifier from the detector unit 10, and the construction of such devices is well-known to those skilled in the art. Since the axis of the detector rotor 27 is initially set perpendicular to the detector stator flux axis while the gyro spin axis is in compass correspondence with the magnetic compass magnets such that the alternating current across the detector output leads 32 remains zero, any turning of the compass magnets relative to the aircraft in response to aircraft maneuvering that is accompanied by corresponding rotation of the gyroscope relative to the instrument frame will result in zero signal output from the detector rotor. However, upon any departure of the gyro spin axis from the predetermined relationship with respect to the compass magnets, an alternating current error signal will appear, in detector output leads 32, which is of a phase and magnitude to cause rectifier-amplifier 13 to deliver the appropriate direct current to the torque motor. Thereupon, the gyroscope spin axis is precessed to the correct heading, and detector rotor 27 is oriented such that it produces zero signal alternating current output.

A remote indicator 11 may operate to deliver visual indications of the craft heading which will be devoid of the short period oscillations of the magnetic compass and of the longer period errors of an uncompensated directional gyroscope. This is facilitated by the indicator transmitter 12, having a rotor 36 coupled with the gyro shaft 19. The rotor 36 is comprised of magnetic elements, and the transmitter stator includes a saturable core 37 and toroidal coil 38 similar to the compass transmitter coil. Coil 38 is excited by a source of alternating current, represented by terminals 39 and is connected in parallel with a corresponding polyphase coil 40 mounted upon stator core 41 of the remote indicator. As is well known in the art, voltages established in transmitter coil 38 produce a field across the indicator coil 40 which drives the indicator rotor magnet 42, and pointer 43 coupled therewith, into correspondence with the angular position of the transmitter rotor magnet assembly 36.

To the system as described thus far, a deviation compensator device 44 is added to compensate for the errors in azimuth indications resulting from errors in the several system components and installation and other factors. This device includes a coil 45 wound upon a saturable magnetic core 46, the structure being similar to that of the stator core and coil of the compass transmitter 9. Preferably, the power factor of coil 45 is made the same as that of the compass transmitter coil 23 so that the second harmonic voltages therefrom will bear the desired phase relationship. Coil 45 is connected in parallel with the polyphase indicator transmitter winding 38 and is excited by the same alternating current source. Coaxial with the annular coil 45 is positioned a Z-shaped magnetic rotor 47 which aligns itself with the azimuth heading of the indicator transmitter rotor assembly 36 in a manner similar to that of the remote indicator rotor 42. Thus, rotor 47 aligns itself with the azimuth indication of the directional gyroscope. Aligned with the legs of the Z-shaped rotor are two annular stacks of laminations, 48, consisting of ferro-magnetic material. Dispersed between the end of one of the legs of the rotor 47 and one of the lamination stacks 48 is a series of sets of adjustable coils, 49, each set comprising two oppositely-wound coils, 50 and 51, connected in series, all of the coil sets being serially connected. Output leads 52 connect the currents from this coil combination in series with the output of the Selsyn detector rotor coil 31 when the switch 33 is open.

The saturable magnetic core 46 of the compensator unit 44 becomes saturated twice during each cycle of the alternating current signal delivered to the toroidal coil 45 from terminals 39, and, during those intervals in each cycle when this core is not saturated, most of the flux from the two ends of the Z-shaped rotor assembly will traverse said core. However, during those intervals in each cycle when the core is saturated, its permeability decreases and its reluctance to the rotor magnets' flux increases such that more of the flux from the rotor passes through the lamination stacks. In this manner, second harmonic voltages are induced in one or more of the coils in a set due to the changes in the flux linking the coil or coils. As previously set forth, each of the coil sets includes two oppositely wound adjustable coils, and, if one of these is positioned in the gap between the rotor end and the lamination stack, its induced voltage will be of one polarity, and, if the other of these coils is so positioned, its induced voltage will be of the opposite polarity. The adjustability of these coils also permits the desired variations in the magnitudes of the induced voltages. The output voltages from the compensator unit across output leads 52 will therefore be adjustable in phase and amplitude for any angular position of the rotor at which compensator coil sets are provided. Since these output voltages are impressed upon the rectifier-amplifier input serially with the induced voltages from the Selsyn detector rotor coil 31, the gyroscope will be precessed by the torque motor coils 34 until the voltage output from the Selsyn detector 10 is equal in amplitude and opposite in phase to the voltage output from the compensator unit. Therefore, for any position at which a coil set is substantially opposite the rotor of the compensator, the amount by which the gyroscope position is corrected is controllable.

Figure 2:
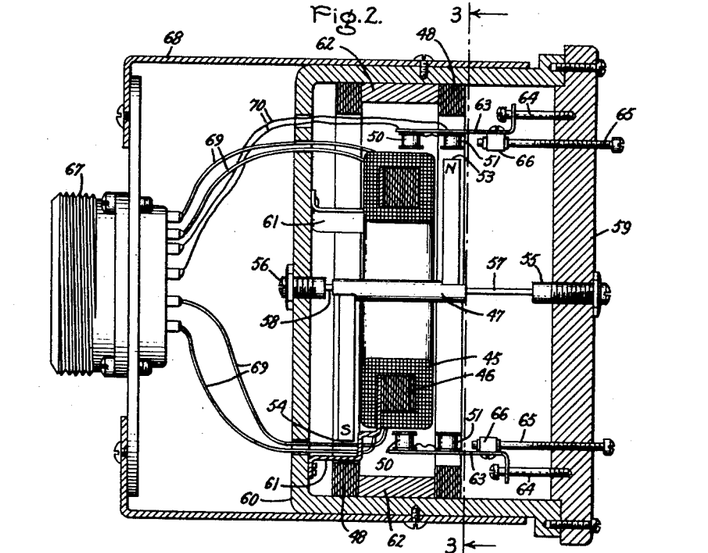
Figure 2 depicts pictorially a longitudinal cross-section of a preferred embodiment of an error compensator device.
Figure 3:
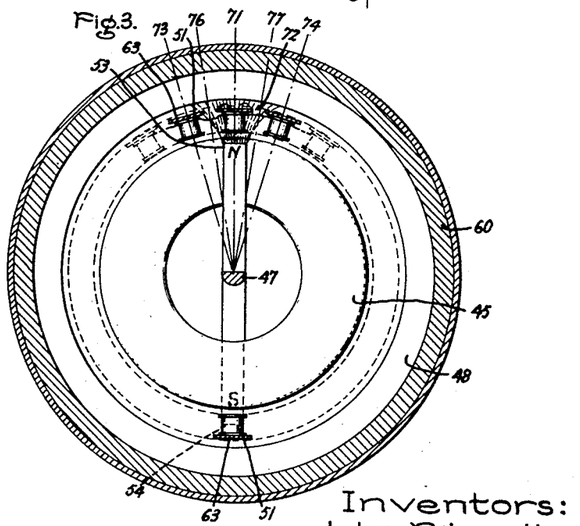
Figure 3 represents the transverse cross-section of the error compensator device of Figure 2 taken along section line 3—3.

In Figure 2, a longitudinal cross-section of one preferred embodiment of a compensator device appears, and Figure 3 represents the further cross-section thereof taken along section-line 3—3 of Figure 2. Portions of this compensator which correspond to the schematically-portrayed unit 44 of Figure 1 have been assigned the same numeral identifications for convenience in understanding the operation thereof in terms of the preceding description. Thus, Z-shaped rotor 47 is illustrated with opposite magnetic poles at the ends 53 and 54 thereof. Bearings 55 and 56 pivotally support this rotor on the extension shafts 57 and 58 therefrom, and these bearings are in turn mounted in the outer frame members 59 and 60, respectively, which form portions of the housing for the compensator unit. Annular core 46 and the coil 45 wound thereon are coaxially aligned with rotor 47 by brackets 61 which are attached to frame member 60, and this frame member also supports lamination stacks 48 and the spacer member 62, also of ferro-magnetic material, such that the stacks are each aligned with an end of the compensator rotor. Each set of coils 50 and 51 is affixed to a supporting member 63 which is slidably mounted upon a shaft 64 and which is linked to the threaded bolt 65 by the attached bushing 66. Rotation of the bolt 65, threaded into frame member 59, causes the bushing 66, fixed axially with respect to bolt 65, and the coil set to advance into or withdraw from the gap between end 53 of the rotor and lamination stack 48, thereby varying the phase and magnitude of the second harmonic voltages induced in the coil set. Connector 67 mounted in the housing member 68 provides electrical terminals for the anular coil polyphase connections 69 and the output leads 70 from the serially coupled coil sets.

Figure 4:
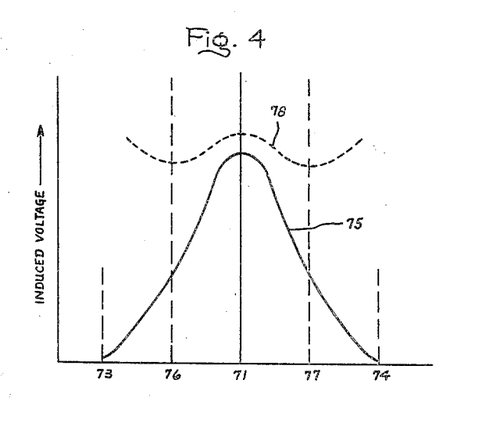
Figure 4 graphically portrays the voltages induced in the error compensator of Figures 2 and 3.

The rotor 47 in Figure 3 is shown to have its end 53 in alignment with one coil set at position 71. When the coils at position 71 are adjusted for a maximum output voltage induced therein by magnetic field 72 linking these coils, and the coils at positions 73 and 74 are set for zero net voltage, the pattern of induced voltage in the output coils versus rotor position is as represented by curve 75 in Figure 4. Positions 76 and 77 are intermediate the equally-spaced coil positions. However, when the coils at positions 73 and 74 are also adjusted for maximum induced voltage, the induced voltage pattern is as depicted by curve 78 in Figure 4. The amount of dip in this curve between coil positions is controllable by proper dimensioning of the air gaps, coils, and rotor magnets. Output voltage curves to satisfy any predetermined correction pattern may be realized by appropriate adjustment of the coil sets.

Figure 5:
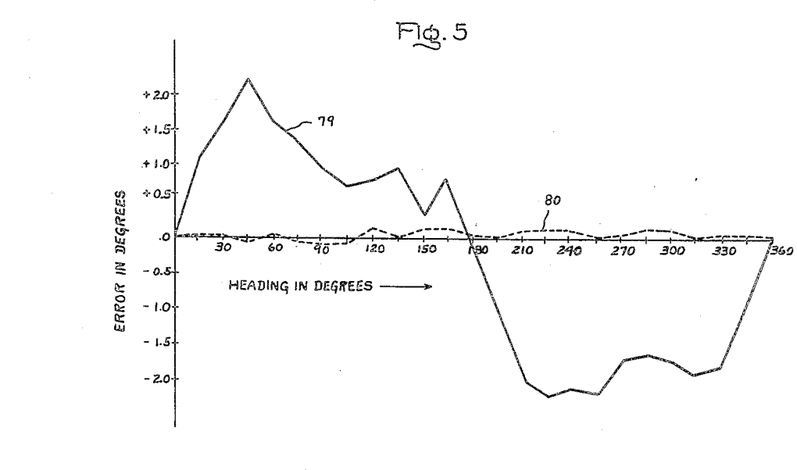
Figure 5 shows the plots of compensated and uncompensated output indications from a compass-controlled directional gyroscope system.

Figure 5 is representative of the errors which may appear in a compensated and an uncompensated compass-controlled directional gyroscope system. The solid-line pole 79 indicates the error in degrees of the detector heading as the magnetic compass transmitter was rotated to successive 15 degree positions and the detector turned to a corresponding null or zero output orientation. The compensator device was not included in this system for the determination of curve 79, and it should be observed that errors of a magnitude of over ±2 degrees obtained. Dashed-line curve 80 depicts the resultant error after compensation was introduced by a compensator device having stations or coil sets at 15 degree points, and errors of ±0.1 degree resulted. Adjustment of the compensator coil sets is preferably made such that errors are minimized between these stations and not merely reduced to substantially zero level at the stations where the coil sets are located.

The compensator device 44 of the compass-controlled directional gyroscope system illustrated in Figure 1 may have its rotor 47 directly actuated by the gyroscope output shaft 19 through a coupling 81. This form of actuation is of advantage physically over electrical positioning arrangements where the gyroscope and compensator are mounted within the same housing, and, further, there is the advantage that errors in translating the gyroscope output shaft orientation into compensator rotor orientation are not introduced. In systems which do not incorporate remote indicators, direct coupling of the compensator rotor with the gyroscope output shaft also eliminates the need for a transmitter unit such as 12.

In the compensator device of Figures 2 and 3, numerous features of one preferred embodiment have been disclosed which it would be improper to construe as limiting the scope of this invention. Essentially, the compensator arrangement of these figures is one wherein a magnetic rotor is positioned in accordance with the angular orientation of a member which is to be corrected for errors thereof, wherein the flux between at least one end of the rotor and a low-reluctance flux path spaced therefrom is caused to fluctuate by the periodic saturation of a second flux path in proximity with the rotor end, and wherein a plurality of pick-up coils, serially connected, are adjustably positioned in the space between the rotor end and the first low-reluctance path such that corrective voltages of the desired phase and magnitude are induced therein by the fluctuating magnetic flux when the rotor end is disposed opposite them. Clearly then, the magnetic rotor may be actuated directly by the rotatable member to which it is responsive, or may be actuated by a remote electrical positioning system. Although the rotor structure heretofore described is Z-shaped, it may, of course, have other configurations consistent with the production of the desired results. Merits of the Z configuration, however, obtain from the small air gap which may be secured between the annular lamination stacks and the end of the rotor not employed to induce voltages in the pick-up coils, and also from the removal of this other rotor end from the vicinity of the pick-up coils. Also, the outer flux path, shown to comprise two stacks of laminations and an intermediate spacer, may comprise but one low-reluctance member suitably designed to provide a flux return path cooperating with the magnetic rotor. The second flux path, which is periodically saturated, need not have a polyphase-connected winding thereabout when the rotor is directly actuated. In addition, movement of the pick-up coils may be accomplished by any convenient mechanisms, the distribution and number of the coils about the compensator may be varied in accordance with the particular results which are to be produced, and the interconnection of the individual pick-up coils may be other than serial.

Figure 6:
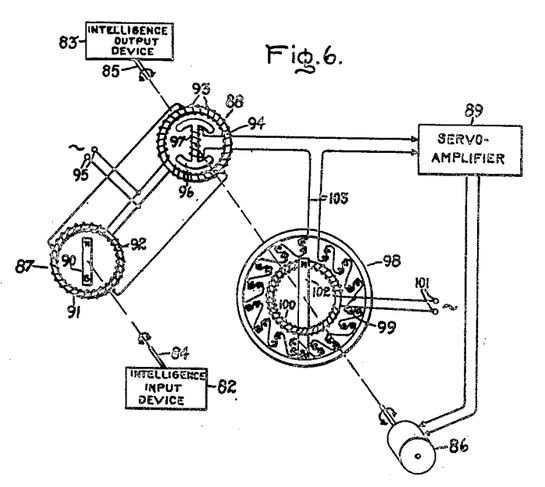
Figure 6 illustrates a telemetering arrangement including an error compensator in accordance with this invention.

A basic intelligence-conveying system in which errors are made negligible in conformity with the subject invention is illustrated in Figure 6. The intelligence input device 82 and output device 83, each having a rotatable member, 84 and 85 respectively, whose angular orientation conveys intelligence, may comprise the conventional input and output elements of systems such as data transmission and servo systems. Analyzed as a servo arrangement, it is apparent that when input shaft 84 is rotated to any position, the output shaft 85 must be correspondingly rotated by the servomotor 86 coupled therewith. This is accomplished by the transmitter 87, detector 88, and servo amplifier 89. Magnetic rotor 90 of transmitter 87 is rotated with the input shaft 84 and causes second harmonic voltages to be set up in the winding 91 upon the transmitter stator core 92. The electrical detector unit 88 also includes a stator winding 93, which has polyphase coupling with the transmitter winding 91, whereby diametric flux across the detector stator core 94 is produced in angular correspondence with the transmitter rotor. Stator windings 91 and 93 are energized from common alternating current supply terminals 95. When the detector rotor 96 is not aligned with the diametric flux, voltages are induced in the rotor coil 97 which are representative in phase and amplitude, of the sense and magnitude of the lack of angular correspondence between input and output shafts 84 and 85. These voltages are applied to the servo amplifier 89 which accordingly delivers appropriate direct current signals to the servomotor 86 and causes this motor to properly align the output shaft. Coupled with the output shaft and servomotor 86 is an error compensator device 98 which, for any angular position of the output shaft, delivers to the servo amplifier 89 a corrective signal whose phase and amplitude are such that the servomotor is caused to orient the output shaft 85 despite electrical and mechanical errors in the system. Compensator 98 is similar in construction to the compensator 44 of Figure 1 except that the saturable core 99 thereof is saturated by a single-phase winding 100 coupled with alternating current terminals 101, and the magnetic rotor 102 is directly coupled for rotation with output shaft 85. The output of corrective signals from serially-connected pairs of oppositely-wound serially-coupled pick-up coils appears in leads 103 and is applied to the servo amplifier 89 in series combination with the signals from the detector rotor coil 97. Substantially equivalent results obtained when the compensator rotor 102 is coupled with the input shaft 84 rather than the output shaft 85, and it should be understood that such alternative coupling is productive of an intelligence conveying system contemplated within the scope of this invention. Still further, automatic electrical positioning of the compensator rotor may be secured by polyphase coupling of the compensator saturating coil 100 with the transmitter stator coil 91. Adjustment of the pick-up coils may be accomplished by means such as those illustrated in Figure 2.

Figure 7:
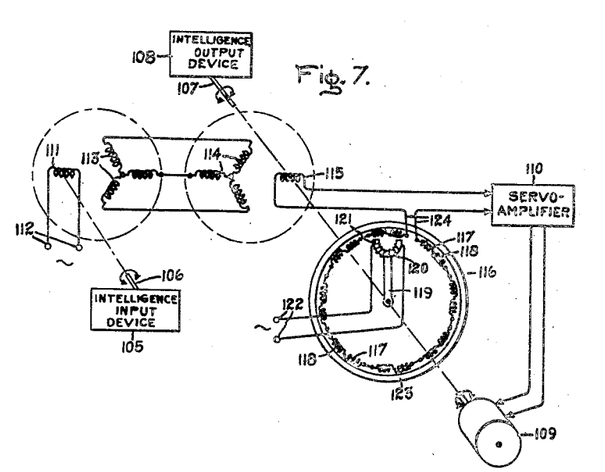
Figure 7 shows an alternative embodiment of an error compensator employed in a control system.

A system employing a modified compensator arrangement with the scope of this invention in conjunction with a Selsyn generator and Selsyn control transformer combination appears in Figure 7. Intelligence input device 105 accomplishes rotation of an input shaft 106 and the output shaft 107 of the intelligence output device 108 is correspondingly positioned by the servomotor 109 which responds to signals from the servo amplifier 110. Coupled with input shaft 106 is the Selsyn generator rotor winding 111 which is excited from alternating current supply terminals 112 and which induces in the coils of the generator stator 113 voltages characteristic of the rotor orientation. As is well-known, these stator coil voltages when transferred to the stator coils 114 of a Selsyn control transformer, produce a combined field having the same direction as the generator rotor field, and any lack of angular correspondence between the control transformer rotor 115 and the generator rotor 111 results in an output signal from rotor 115 which is representative in phase and magnitude of this error. Control transformer rotor 115 is coupled with output shaft 107 and motor 109 for this purpose, and the output signals therefrom are applied to the servo amplifier 110. It should be recognized that these rotor output signals are of the same fundamental frequency as the voltages energizing the generator rotor 111. Therefore, the error compensator device 116 utilized with this system is designed to yield corrective signals having the same fundamental frequency. Oppositely-wound pick-up coils 117 and 118 are connected in series and grouped in pairs distributed about the circular path described by the compensator rotor 119 coupled with the ouput shaft 107 and servomotor 109. The fluctuating magnetic flux of this compensator arrangement is produced by the rotor coil 120 wound upon a core 121 and energized from the alternating current terminals 122 which may be the same as terminals 112. Coils 117 and 118 are adjustably positioned to intercept the flux from rotor core 121 and deliver corrective signals of predetermined phase and magnitude when the rotor has predetermined orientations. An outer flux path 123 is provided to distribute the rotor flux over desired paths, although the compensator is operable when this element is dispensed with. Corrective signals of the appropriate frequency, phase, and magnitude to compensate for system inaccuracies are thus produced in compensator output leads 124 and are serially combined with the Selsyn control transformer output for application to the servo amplifier. Comparable results obtain when the compensator rotor 119 is coupled with the Selsyn generator rotor 111 rather than with the servomotor and output shaft 107, and it is intended that this invention embrace the arrangement so produced.

While particular embodiments of the subject invention have been shown and described herein, these are in the nature of description rather than limitation and it will occur to those skilled in the art that various changes, modifications, and combinations may be made within the province of the appended claims without departing in spirit or scope from this invention in its broader aspects.

What we claim as new and desire to secure by Letters Patent of the United States is:

1. A compass-controlled gyroscope system, comprising a directional gyroscope, torque motor means for precessing said directional gyroscope, a magnetic compass, means for detecting variations in the heading of said magnetic compass and said gyroscope and for producing output signals characteristic of said variations, a compensator device for producing output signals having predetermined characteristics when said gyroscope assumes predetermined orientations, and means for applying signals to said torque motor to precess said gyroscope responsive to the combined output signals from said detecting means and compensator device.

2. A compass-controlled directional gyroscope system, comprising a directional gyroscope, torque motor means for precessing said gyroscope, a magnetic compass, means for detecting variations in the heading of said gyroscope with reference to the heading of said magnetic compass and for producing output signals characteristic, in phase and amplitude, of said variations, a compensator device for producing output signals having predetermined phase and amplitude characteristics when said gyroscope assumes predetermined orientations, and means for applying signals to said torque motor to precess said gyroscope responsive to the combined output signals from said detecting means and compensator device, said output signals from said compensator device being of such phase and amplitude that, in combination with said output signals from said detecting means, said signals cause said torque motor means to precess said gyroscope into substantially errorless correspondence with said compass.

3. A compass-controlled directional gyroscope system, comprising a directional gyroscope indicating azimuth headings by the angular positions of a rotatable member; a magnetic compass transmitter; an electrical detector Selsyn having its rotor coupled with said member and its stator coil in polyphase connection with the stator coil of said magnetic compass transmitter; at least one remote indicator; a position transmitter having its rotor coupled with said member and its stator coil in polyphase connection with the stator coil of said remote indicator; a compensator device including a magnetic rotor, a stator coil in polyphase connection with said stator coil of said position transmitter, flux conducting means spaced from said magnetic rotor, and a plurality of serially coupled pairs of serially connected pick-up coils adjustably positioned between said magnetic rotor and said flux conducting means; torque motor means for precessing said gyroscope; and means for actuating said torque motor means responsive to the combined output signals from said detector Selsyn and said pick-up coils.

4. The compass-controlled directional gyroscope system according to claim 3 wherein said pairs of pick-up coils are positioned such that second harmonic voltages are induced therein when said compensator rotor has predetermined angular orientations, and said pairs of pick-up coils are each movable within the space between said compensator rotor and flux conducting means to produce a second harmonic voltage of predetermined phase and amplitude.

5. In a compass-controlled directional gyroscope system including a directional gyroscope, a magnetic compass, means for detecting variations in the heading of said gyroscope with reference to said compass and for producing output signals characteristic of said variations, and torque motor means for precessing said gyroscope responsive to said output signals from said detecting means applied thereto, the error compensator device comprising means for producing flux signals having the same frequency as said detecting means output signals, means for producing output signals having predetermined characteristics from said flux signals, means controlling the production of said compensator output signals such that they occur when said gyroscope has predetermined headings, and means applying said compensator output signals to said torque motor means in combination with said detecting means output signals.

6. In a compass-controlled directional gyroscope system including a directional gyroscope, a magnetic compass, means for detecting variations in the heading of said gyroscope with reference to said compass and for producing output signals characteristic of said variations, and torque motor means for precessing said gyroscope responsive to said output signals from said detecting means, the error compensator device comprising a rotor angularly positioned in accordance with the heading of said gyroscope, means cooperating with said rotor for producing alternating flux having the same frequency as said detecting means output signals, means for producing output signals having predetermined characteristics from said alternating flux when said rotor has predetermined angular orientations, and means applying said compensator output signals to said torque motor means in combination with said detecting means output signals.

7. A compensator device, comprising means for producing alternating flux and directing said flux over predetermined paths, means for deriving a plurality of electrical signals having predetermined phase and amplitude characteristics from said flux when said flux is directed over said predetermined paths, and means for adjusting each of said signal deriving means to produce a predetermined phase and amplitude of electrical signals therefrom.

8. A compensator device, comprising a rotatable member, means producing alternating flux through paths including one end of said member, means deriving electrical signals from said alternating flux at each of a plurality of predetermined orientations of said rotatable member, and means for adjusting said signal-deriving means to produce electrical signals having predetermined phase and amplitude characteristics.

9. A compensator device, comprising a rotatable member, means producing alternating flux through paths including one end of said member, windings disposed to intercept said alternating flux, when said rotor has predetermined angular orientations, means for adjusting the amount of flux intercepted by said windings to establish a predetermined phase and amplitude of signals induced in said windings, and means conducting said signals from said windings to an output circuit.

10. A compensator device, comprising a rotatable magnetic member, a low reluctance flux path spaced from said member, means producing a flow of alternating flux between said flux path and at least one end of said rotatable member for any angular position of said rotatable member, windings disposed between said flux path and said end of said rotatable member to have voltages induced therein by said flux, means for adjusting the phase and magnitude of said voltages induced in said windings, and means conducting said voltages from said windings to an output circuit.

11. A compensator arrangement, comprising a rotatable magnetic member, a low reluctance flux path element concentric with said member, an annular saturable magnetic core concentric with said member, a winding arrangement upon said core, an alternating current source energizing said winding arrangement and periodically saturating said core such that the magnitude of flux passing between said magnetic member and said low-reluctance element fluctuates, a plurality of pairs of oppositely-wound coils positioned between said element and said rotatable member and adjustable to intercept the flux passing therebetween such that voltages having predetermined phase and amplitude are induced in said coils, means for angularly positioning a controlled device responsive to said voltages, and means for angularly positioning said rotatable member in accordance with the orientation of said controlled device.

12. A compensator arrangement according to claim 11 wherein said rotatable magnetic member has one end spaced from said low-reluctance element and another end in proximity with said element, said coils are positioned in the space between said one end of said member and said element, said coils in each pair are serially connected, and said pairs of coils are serially connected.

13. A compensator arrangement, comprising a Z-shaped magnetic rotor, a low-reluctance flux path element concentric with said rotor, a plurality of serially-connected pairs of oppositely-wound serially-connected coils each positioned in the flux path between said low-reluctance element and one end of said rotor, an annular saturable magnetic core concentric with said rotor, a winding arrangement upon said core, an alternating current source energizing said winding arrangement and periodically saturating said core such that the magnitude of flux passing between said rotor end and said low-reluctance element fluctuates, means for adjusting each of said pairs of coils in said flux path to establish that voltages of predetermined phase and magnitude be induced therein, and means coupling the voltages from said coils to an output circuit.

14. An intelligence conveying system, comprising an intelligence input device having a rotatable member, an intelligence output device having a rotatable member, means for producing signals characteristic of the differences in the angular orientations of said rotatable members, means producing magnetic flux of varying intensity, means for angularly orienting said flux in accordance with the angular orientation of one of said members, windings disposed for the inducing of voltages therein by said flux at predetermined angular orientations, means for adjusting the positions of said windings to vary the characteristics of the voltages induced therein, means for combining said winding voltages and said signals, and means for rotating said output member responsive to said combined voltages and signals.

15. An intelligence conveying system, comprising an intelligence input device having a rotatable member, an intelligence output device having a rotatable member, an angular position transmitter coupled with said rotatable input member and energized from an alternating current source, an electrical angular correspondence detector coupled with said rotatable output member and in polyphase connection with said transmitter, whereby the second harmonic output signals from said detector represent in phase and amplitude the sense and magnitude of variations in angular correspondence between said input and output members, a magnetic rotor coupled with one of said rotatable members, a saturable core in proximity with an end of said rotor, winding means about said core energized to periodically saturate said core, whereby flux from said rotor end is caused to fluctuate, coils positioned to have voltages induced therein by said fluctuating flux when said rotor has predetermined angular orientations, means for adjusting said coils such that voltages having predetermined phase and amplitude are induced therein, and means responsive to said detector signals and said voltages for rotating said rotatable output member.

16. An intelligence conveying system, comprising an intelligence input device having a rotatable member, an intelligence output device having a rotatable member, a Selsyn generator having a rotor coupled with said rotatable input member, a Selsyn control transformer having a rotor coupled with said rotatable output member, the stator windings of said generator and transformer being interconnected, whereby the rotor coil of said control transformer produces output signals characteristic of variations in correspondence between the angular orientations of said input and output members, a core of magnetic material mounted for rotation with one of said rotatable members, a coil arrangement upon said core and excited from an alternating current source, whereby alternating flux is produced in the vicinity of said core, coils positioned to have voltages induced therein by said flux when said core has predetermined angular orientations, means for adjusting said coils such that voltages having predetermined characteristics are induced therein, and means responsive to said control transformer signals and said voltages for rotating said output member.

JOHN E. LUNDBERG.
ROBERT G. BALLARD.

REFERENCES CITED

The following references are of record in the file of this patent:

UNITED STATES PATENTS

| Number | Name | Date |
| --- | --- | --- |
| 2,178,306 | Lauck | Oct. 31, 1939 |
| 2,412,356 | Roberts et al. | Dec. 10, 1946 |
| 2,457,532 | Cunningham | Dec. 28, 1948 |
| 2,459,830 | McCarthy | Jan. 25, 1949 |
| 2,486,784 | Holden | Nov. 1, 1949 |